(12) United States Patent
Kato et al.

(10) Patent No.: US 10,106,198 B2
(45) Date of Patent: Oct. 23, 2018

(54) VEHICLE UPPER BODY STRUCTURE

(71) Applicant: HONDA MOTOR CO., LTD., Tokyo (JP)

(72) Inventors: Yasuyuki Kato, Wako (JP); Shuichiro Iwatsuki, Wako (JP); Momoka Fujii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 15/298,861

(22) Filed: Oct. 20, 2016

(65) Prior Publication Data

US 2017/0113733 A1    Apr. 27, 2017

(30) Foreign Application Priority Data

Oct. 22, 2015  (JP) ................................. 2015-208317

(51) Int. Cl.
    *B62D 25/06*    (2006.01)
    *H01Q 1/32*     (2006.01)
    *H01Q 1/12*     (2006.01)

(52) U.S. Cl.
    CPC ........... *B62D 25/06* (2013.01); *H01Q 1/1207* (2013.01); *H01Q 1/3275* (2013.01)

(58) Field of Classification Search
    CPC ..................................................... B62D 25/06
    USPC ......................................................... 296/210
    See application file for complete search history.

(56) References Cited

U.S. PATENT DOCUMENTS

| | | | |
|---|---|---|---|
| 6,786,538 B1* | 9/2004 | Turk ...................... | B62D 25/06 296/210 |
| 9,027,989 B1* | 5/2015 | Joyce ..................... | B62D 25/06 296/210 |
| 2006/0186707 A1* | 8/2006 | Schoenauer ........... | B60J 7/0015 296/210 |
| 2009/0033128 A1* | 2/2009 | Hoelzel .................. | B60J 7/0084 296/216.01 |

(Continued)

FOREIGN PATENT DOCUMENTS

| | | |
|---|---|---|
| JP | 64-56280 A | 3/1989 |
| JP | 2007-62505 A | 3/2007 |

(Continued)

OTHER PUBLICATIONS

Office Action dated Jun. 26, 2017, issued in counterpart Japanese Application No. 2015-208317, with machine translation. (6 pages).

*Primary Examiner* — Joseph D. Pape
(74) *Attorney, Agent, or Firm* — Westerman, Hattori, Daniels & Adrian, LLP

(57) ABSTRACT

A vehicle upper body structure includes a roof panel, a roof arch that extends across the roof panel in a vehicle width direction and that is joined to a lower surface of the roof panel, and a roof antenna disposed on an upper surface of the roof panel. The roof arch includes a first roof arch and a second roof arch disposed in front of the first roof arch. An antenna bracket that allows the roof antenna to be mounted thereon extends frontward from a midpoint of the first roof arch in the vehicle width direction or a vicinity of the midpoint. The antenna bracket supports the roof panel, and the second roof arch is disposed so that as viewed from above the vehicle body, at least part of the second roof arch extends between right and left rear pillars.

10 Claims, 3 Drawing Sheets

(56) References Cited

U.S. PATENT DOCUMENTS

| | | | | |
|---|---|---|---|---|
| 2014/0123495 A1* | 5/2014 | Hill | ............... | B23K 11/115 |
| | | | | 29/897.2 |
| 2014/0217783 A1* | 8/2014 | Hida | ............... | B62D 25/06 |
| | | | | 296/210 |

FOREIGN PATENT DOCUMENTS

| | | |
|---|---|---|
| JP | 2012-131338 A | 7/2012 |
| JP | 2015-112916 A | 6/2015 |

* cited by examiner

VEHICLE UPPER BODY STRUCTURE

CROSS REFERENCES TO RELATED APPLICATIONS

The present application claims priority under 35 U.S.C. § 119 to Japanese Patent Application No. 2015-208317, filed Oct. 22, 2015, entitled "Vehicle Upper Body Structure." The contents of this application are incorporated herein by reference in their entirety.

TECHNICAL FIELD

The present disclosure relates to a vehicle upper body structure including a roof antenna.

BACKGROUND

The upper section of a vehicle body is covered by a roof panel. One of existing technologies related to a vehicle upper body structure that supports a roof panel is described in Japanese Unexamined Patent Application Publication No. 64-56280.

In the vehicle upper body structure described in Japanese Unexamined Patent Application Publication No. 64-56280, a roof arch that supports the roof panel extends laterally between both sides of the vehicle body. The roof panel is supported by the roof arch that is joined to the lower surface of the roof panel, which extends between both ends of the vehicle in the vehicle width direction.

In the case of snow fall, the snow may pile up on the top surface of the roof panel. Accordingly, the upper section of the vehicle body needs to have a sufficient strength for the load due to, for example, snow.

SUMMARY

The present application describes, for example, a vehicle upper body structure having a higher strength than existing upper body structures.

According to a first aspect of the present disclosure, a vehicle upper body structure includes a roof panel, a roof arch that extends completely across the roof panel in a vehicle width direction and that is joined to a lower surface of the roof panel, and a roof antenna disposed on an upper surface of the roof panel. The roof arch includes a first roof arch and a second roof arch disposed in front of the first roof arch. An antenna bracket that allows the roof antenna to be mounted thereon extends forward from a midpoint of the first roof arch in the vehicle width direction or a vicinity of the midpoint. The antenna bracket supports the roof panel, and the second roof arch is disposed so that as viewed from above the vehicle body, at least part of the second roof arch extends between right and left rear pillars.

According to a second aspect of the present disclosure, it is desirable that the second roof arch include a rear second arch lateral beam portion extending in the vehicle width direction, a front second arch lateral beam portion disposed in front of the rear second arch lateral beam portion and extending in the vehicle width direction, and a second arch longitudinal beam portion extending from the rear second arch lateral beam portion to the front second arch lateral beam portion in a front-rear direction. The second arch longitudinal beam portion may be disposed in front of the antenna bracket and at the midpoint of the width of the vehicle or the vicinity of the midpoint.

According to a third aspect of the present disclosure, it is desirable that the second roof arch further includes a right second arch longitudinal beam portion and a left second arch longitudinal beam portion extending in the front-rear direction on the right and left sides of the second arch longitudinal beam portion, respectively. The third roof arch may include a rear third arch lateral beam portion extending in the vehicle width direction, a front third arch lateral beam portion disposed in front of the rear third arch lateral beam portion and extending in the vehicle width direction, and a left third arch longitudinal beam portion and a right third arch longitudinal beam portion each extending from the rear third arch lateral beam portion to the front third arch lateral beam portion in the front-rear direction. The left third arch longitudinal beam portion may be located on an outer side of the left second arch longitudinal beam portion in the vehicle width direction, and the right third arch longitudinal beam portion may be located on an outer side of the right second arch longitudinal beam portion in the vehicle width direction.

According to the first aspect of the disclosure, the antenna bracket that allows a roof antenna to be mounted thereon extends forward from the midpoint of the first roof arch in the vehicle width direction or its vicinity. The antenna bracket supports the roof panel. That is, the roof panel is supported by not only the first roof arch but the antenna bracket that extends frontward from the first roof arch. Since a component that supports the roof panel is additionally provided, the surface stiffness of the roof panel increases.

In addition, when viewed from above the vehicle body, at least part of the second roof arch of the vehicle body is disposed to extend between the right and left rear pillars. Each of the rear pillars is a high-strength member that constitutes part of the side portion of the vehicle body. The second roof arch is disposed to extend between the high-strength members. Accordingly, the mounting rigidity of the second roof arch that supports the roof panel increases. As a result, the roof panel is rigidly supported by the second roof arch.

As described above, a member that supports the roof panel is additionally provided, and the roof panel is rigidly supported by the second roof arch. In this manner, the strength of the upper section of the vehicle body can be increased.

According to the second aspect of the disclosure, the second roof arch includes the second arch longitudinal beam portion that extends from the rear second arch lateral beam portion to the front second arch lateral beam portion in the front-rear direction. The second arch longitudinal beam portion is located in front of the antenna bracket and at the midpoint of the vehicle width or its vicinity to support the roof panel.

That is, in the upper section of the vehicle body, the second arch longitudinal beam portion is located at the midpoint of the vehicle width or its vicinity in addition to the antenna bracket. The antenna bracket and the second arch longitudinal beam portion support the roof panel. Accordingly, the surface stiffness of the rear portion of the roof arch in the middle can be increased.

According to the third aspect of the disclosure, the third roof arch is disposed in front of the second roof arch in the vehicle width direction. The third roof arch includes the rear third arch lateral beam portion, the front third arch lateral beam portion, the left third arch longitudinal beam portion, and the right third arch longitudinal beam portion.

The second and third arch longitudinal beam portions on the left are described below. The left third arch longitudinal beam portion is located on the outer side of the left second arch longitudinal beam portion in the vehicle width direction. That is, the left third arch longitudinal beam portion does not overlap the left second arch longitudinal beam portion in the front-rear direction of the vehicle. The left third arch longitudinal beam portion is located more away from the left second arch longitudinal beam portion than in the case where they overlap in the front-rear direction of the vehicle.

This applies to the second and third arch longitudinal beam portions on the right side. The right third arch longitudinal beam portion is located on the outer side of the right second arch longitudinal beam portion in the vehicle width direction. That is, the right third arch longitudinal beam portion does not overlap the right second arch longitudinal beam portion in the front-rear direction of the vehicle. The right third arch longitudinal beam portion is located more away from the right second arch longitudinal beam portion than in the case where they overlap in the front-rear direction of the vehicle.

If the second arch longitudinal beam portion is located away from the third arch longitudinal beam portion on each of the right and left sides, the members that supports the roof panel are widely distributed. In this manner, the surface stiffness of the roof panel can be increased and, thus, the strength of the upper section of the vehicle body can be increased.

BRIEF DESCRIPTION OF THE DRAWINGS

The advantages of the disclosure will become apparent in the following description taken in conjunction with the following drawings.

DETAILED DESCRIPTION

Figure 1:
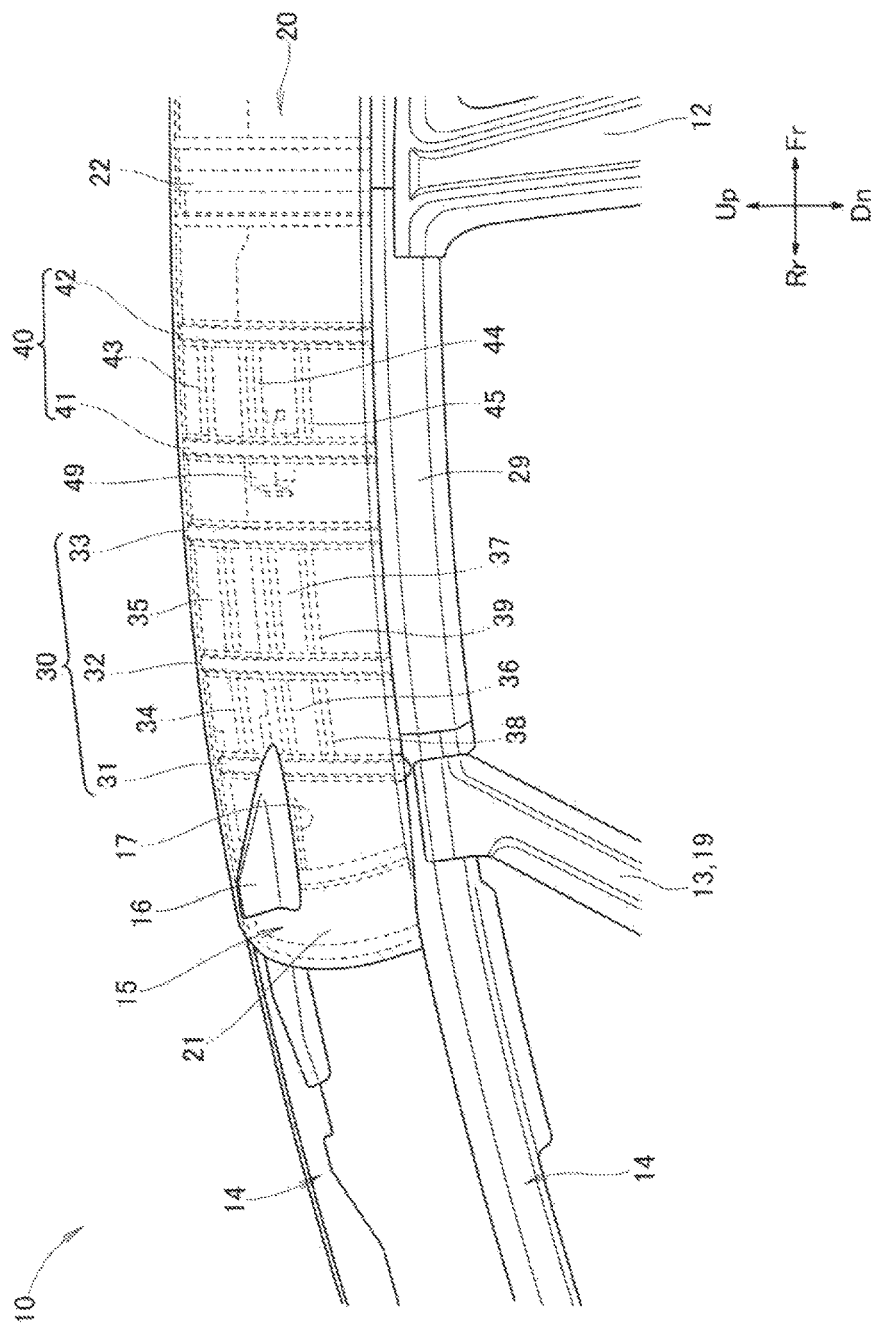
FIG. 1 is a perspective view of a vehicle body including a vehicle upper body structure according to an embodiment of the present disclosure, as viewed from above at an oblique angle.

Exemplary embodiments of the present disclosure are described below with reference to the accompanying drawings. Note that in the following description, the terms "left" and "right" refer to the right side and the left side of the vehicle from the perspective of an occupant of the vehicle, respectively, and the terms "front" and "rear" refer to the front side and the rear side in the vehicle travel direction, respectively. In addition, in the drawings, "Fr" denotes the front side, "Rr" denotes the rear side, "L" denotes the left side from the perspective of the occupant, "R" denotes the right side from the perspective of the occupant, "Up" denotes the upside, and "Dn" denotes the downside.

Exemplary Embodiment

Figure 2:
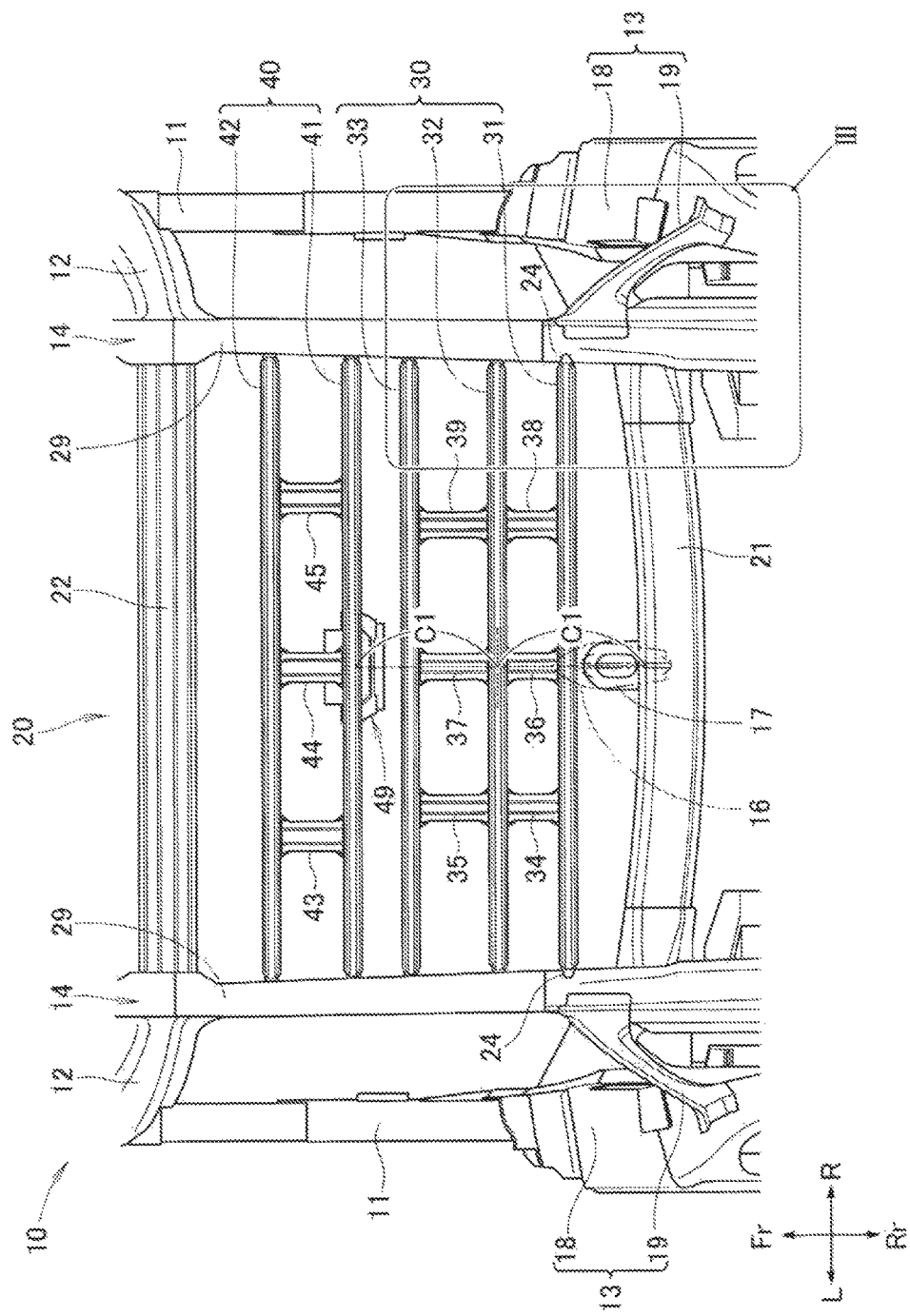
FIG. 2 is a plan view of the vehicle body illustrated in FIG. 1.

FIG. 1 illustrates part of a vehicle body 10 including a vehicle upper body structure according to an embodiment of the present disclosure. As illustrated in FIGS. 1 and 2, the vehicle body 10 includes right and left side sills 11, 11 extending in the front-rear direction, right and left center pillars 12, 12 and right and left rear pillars 13, 13 extending from the right and left side sills 11, 11 in the upward direction, respectively, right and left roof side rails 14, 14 extending in the front-rear direction between the upper ends of the right center pillar 12 and the right rear pillar 13 and between the upper ends of the left center pillar 12 and the left rear pillar 13, a roof arch 20 extending between the right and left roof side rails 14, 14, and a roof panel 15 supported by the roof arch 20. The roof panel 15 has a roof antenna 16 disposed on the upper surface thereof.

The right and left rear pillars 13, 13 include lower rear pillars 18, 18 extending from the right and left side sills 11, 11 to a substantially half the height of the vehicle and upper rear pillars 19, 19 extending from the lower rear pillars 18, 18 upward, respectively.

The upper structure of the vehicle body 10 is described below.

The roof arch 20 includes a rear roof arch 21 (a first roof arch 21), a second roof arch 30 disposed in front of the rear roof arch 21, a third roof arch 40 disposed in front of the second roof arch 30, and a center roof arch 22 disposed in front of the third roof arch 40 and extending between the center pillars 12, 12.

Note that while the present exemplary embodiment has been described with reference to the rear roof arch 21 defined as the first roof arch, the roof arch disposed in front of the rear roof arch 21 may be defined as the first roof arch. In addition, fourth and fifth roof arches may be provided between the third roof arch 40 and the center roof arch 22.

An antenna bracket 17 extends frontward from the rear roof arch 21 at a point located in the substantially middle of the vehicle width. The antenna bracket 17 allows the roof antenna 16 to be attached thereto. The antenna bracket 17 and the second roof arch 30 are disposed with a predetermined space therebetween. That is, the antenna bracket 17 is not connected to the second roof arch 30. The roof antenna 16 is disposed so as to extend from the upper surface of the antenna bracket 17 to the upper surface of the second roof arch 30. That is, the rear roof arch 21 is connected to the second roof arch 30 via the antenna bracket 17 and the roof antenna 16.

One end of the rear roof arch 21, one end of the second roof arch 30, one end of the third roof arch 40, and one end of the center roof arch 22 are joined to the right roof rail 14. The other end of the rear roof arch 21, the other end of the second roof arch 30, the other end of the third roof arch 40, and the other end of the center roof arch 22 are joined to the left roof rail 14. One of two roof side outers 29, 29 is provided on one of the roof side rails 14, 14 so as to extend between the center pillar 12 and the upper rear pillar 19, and the other roof side outer 29 is provided on the other roof side rail 14 so as to extend between the center pillar 12 and the upper rear pillar 19.

The lower surface of the roof panel 15 is joined to the rear roof arch 21, the second roof arch 30, the third roof arch 40, and the center roof arch 22. In addition, the antenna bracket 17 supports the roof panel 15.

As illustrated in FIG. 2, the second roof arch 30 includes lateral beam portions 31, 32, and 33 each extending in the vehicle width direction and longitudinal beam portions 34 to 39 that are formed in an integrated manner with the lateral beam portions 31, 32, and 33 and that extend in the front-rear direction.

The second arch lateral beam portions 31, 32, and 33 include the rear second arch lateral beam portion 31 that extends in the vehicle width direction, the middle second lateral beam portion 32 that is located in front of the rear second arch lateral beam portion 31 and that extends in the vehicle width direction, and the front second arch lateral beam portion 33 that is located in front of the middle second arch lateral beam portion 32 and that extends in the vehicle width direction.

The second arch longitudinal beam portions 34 to 39 include the left rear second arch longitudinal beam portion 34 that is located on the left side in the vehicle width direction and that extends from the rear second arch lateral beam portion 31 to the middle second arch lateral beam portion 32 in the front-rear direction, the left front second arch longitudinal beam portion 35 that extends from the middle second arch lateral beam portion 32 to the front second arch lateral beam portion 33 in the front-rear direction, the center rear second arch longitudinal beam portion 36 that is located at the midpoint in the vehicle width direction and that extends from the rear second arch lateral beam portion 31 to the middle second arch lateral beam portion 32 in the front-rear direction, the center front second arch longitudinal beam portion 37 that extends from the middle second arch lateral beam portion 32 to the front second arch lateral beam portion 33 in the front-rear direction, the right rear second arch longitudinal beam portion 38 that is located on the right side in the vehicle width direction and that extends from the rear second arch lateral beam portion 31 to the middle second arch lateral beam portion 32 in the front-rear direction, and the right front second arch longitudinal beam portion 39 that extends from the middle second arch lateral beam portion 32 to the front second arch lateral beam portion 33 in the front-rear direction.

Note that according to the present exemplary embodiment, the single lateral beam portion 32 (the middle second arch lateral beam portion 32) is disposed between the rear second arch lateral beam portion 31 and the front second arch lateral beam portion 33. However, a plurality of lateral beam portions may be disposed between the rear second arch lateral beam portion 31 and the front second arch lateral beam portion 33. Alternatively, no lateral beam portions may be disposed between the rear second arch lateral beam portion 31 and the front second arch lateral beam portion 33.

The center rear second arch longitudinal beam portion 36 and the center front second arch longitudinal beam portion 37 are located in front of the antenna bracket 17.

The third roof arch 40 includes third arch lateral beam portions 41, 42 and third arch longitudinal beam portions 43 to 45 that are formed in an integrated manner with the third arch lateral beam portions 41, 42 and that extend in the front-rear direction.

The third arch lateral beam portions 41, 42 include the rear third arch lateral beam portion 41 and the front third arch lateral beam portion 42 that is located in front of the rear third arch lateral beam portion 41. A room light bracket 49 is attached to the rear third arch lateral beam portion 41 at the midpoint of the rear third arch lateral beam portion 41 in the vehicle width direction.

The third arch longitudinal beam portions 43 to 45 include the left third arch longitudinal beam portion 43, the center third arch longitudinal beam portion 44, and the right third arch longitudinal beam portion 45 each extending from the rear third arch lateral beam portion 41 to the front third arch lateral beam portion 42 in the front-rear direction.

The left third arch longitudinal beam portion 43 is located on the outer side of each of the left front second arch longitudinal beam portion 35 and the left rear second arch longitudinal beam portion 34 in the vehicle width direction. The right third arch longitudinal beam portion 45 is located on the outer side of each of the right front second arch longitudinal beam portion 39 and the right rear second arch longitudinal beam portion 38 in the vehicle width direction.

In the center of the vehicle in the vehicle width direction, a distance C1 between the rear roof arch 21 and the middle second arch lateral beam portion 32 is the same as a distance C1 between the middle second arch lateral beam portion 32 and the rear third arch lateral beam portion 41. That is, the middle second arch lateral beam portion 32 is located at substantially the midpoint between the rear roof arch 21 and the rear third arch lateral beam portion 41 in the front-rear direction.

Figure 3:
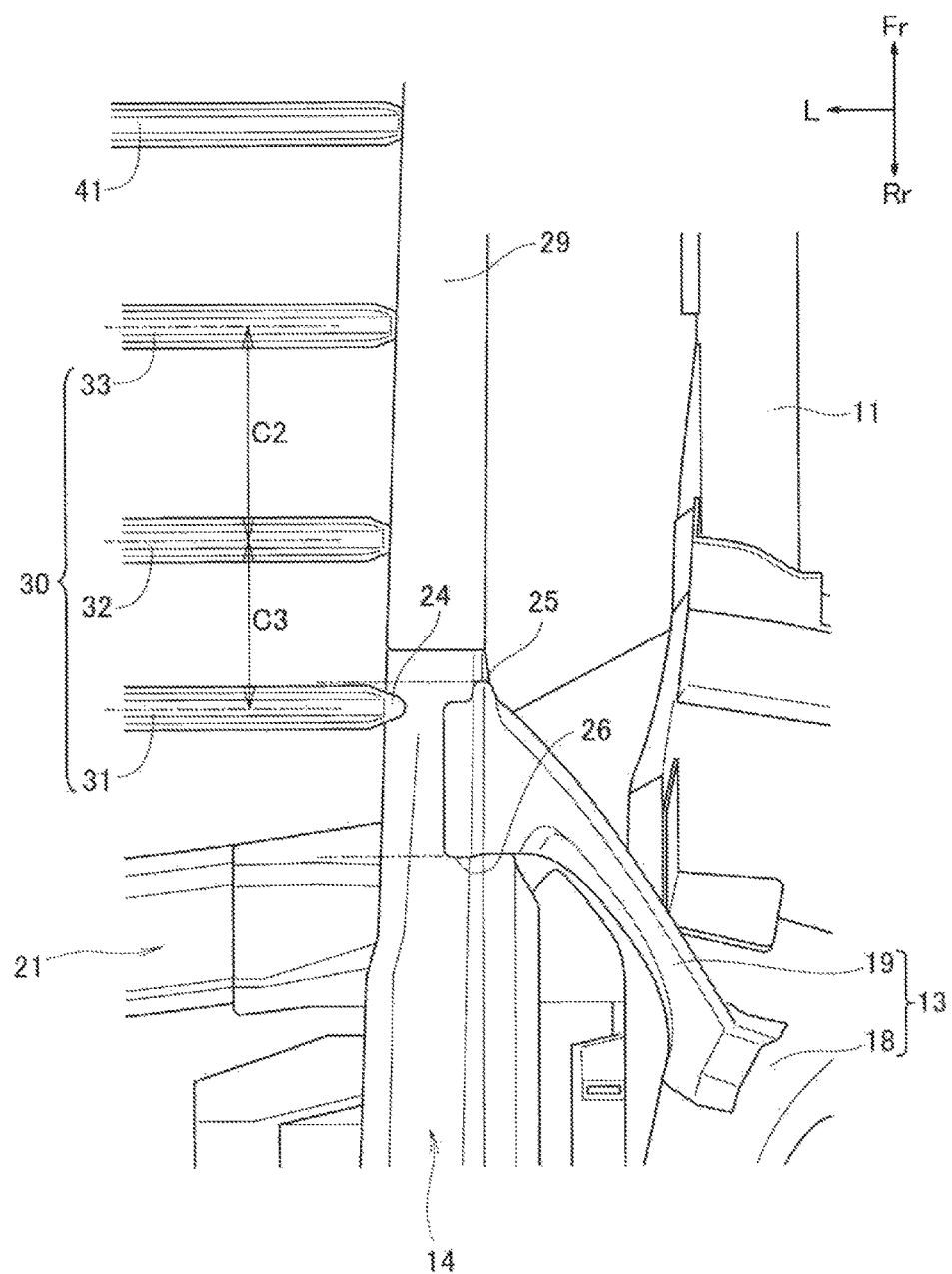
FIG. 3 is an enlarged view of a main portion of the vehicle body illustrated in FIG. 2.

As illustrated in FIGS. 2 and 3, a distance C2 between the middle second arch lateral beam portion 32 and the front second arch lateral beam portion 33 is longer than a distance C3 between the rear second arch lateral beam portion 31 and the middle second arch lateral beam portion 32. That is, the front second arch lateral beam portion 33 is disposed more away from the middle second arch lateral beam portion 32 (toward the rear third arch lateral beam portion 41 having the room light bracket 49 attached thereto) than the rear second arch lateral beam portion 31.

When viewed from above the vehicle body 10, the second roof arch 30 is disposed to extend between the right and left upper rear pillars 19, 19 (between the right and left rear pillars 13, 13) (refer to FIG. 2). According to the present exemplary embodiment, an end portion 24 of the second roof arch 30 is located at substantially the same location as the front edge portion 25 of the upper rear pillar 19. However, at least part of the second roof arch 30 can be located at any position between the front edge portion 25 and a rear edge portion 26 of the upper rear pillar 19. The left side structure of the vehicle body 10 is similar to the right side structure. Thus, description of the left side structure is not repeated.

The operation and effect of the present disclosure are described below.

As illustrated in FIGS. 1 and 2, the antenna bracket 17 extends frontward from the midpoint of the rear roof arch 21 in the vehicle width direction. The antenna bracket 17 allows the roof antenna 16 to be attached thereto. The antenna bracket 17 supports the roof panel 15. That is, the roof panel 15 is supported by not only the rear roof arch 21 but the antenna bracket 17 that extends frontward from the rear roof arch 21. Since a component that supports the roof panel 15 is additionally provided, the surface stiffness of the roof panel 15 increases.

As illustrated in FIGS. 1, 2, and 3, in addition, the end portion 24 of the second roof arch 30 is located at substantially the same position as the front edge portion 25 of the upper rear pillar 19 in the front-rear direction. The left side structure of the vehicle body 10 is similar to the right side structure. The upper rear pillar 19 is a member that constitutes part of the vehicle body side portion and that has a high strength. The second roof arch 30 extends laterally between the members having a high strength. Accordingly, the mounting rigidity of the second roof arch 30 that supports the roof panel 15 is high. As a result, the roof panel 15 is rigidly supported by the second roof arch 30.

That is, the roof panel 15 is additionally supported by a new member. In addition, the roof panel 15 is rigidly supported by the second roof arch 30. In this manner, the strength of the upper section of the vehicle body 10 can be increased.

Referring back to FIG. 2, the second roof arch 30 includes the center rear second arch longitudinal beam portion 36 and the center front second arch longitudinal beam portion 37. The center rear second arch longitudinal beam portion 36 and the center front second arch longitudinal beam portion 37 are located in front of the antenna bracket 17 and in the center of the vehicle width and support the roof panel 15.

That is, in the upper section of the vehicle body 10, the center rear second arch longitudinal beam portion 36 and the center front second arch longitudinal beam portion 37 are located in the center of the vehicle width in addition to the antenna bracket 17. The antenna bracket 17, the center rear second arch longitudinal beam portion 36, and the center front second arch longitudinal beam portion 37 support the roof panel 15. Accordingly, the surface stiffness of a rear center portion of the roof panel 15 is increased.

In addition, the left third arch longitudinal beam portion 43 is located on the outer side of each of the left front second arch longitudinal beam portion 35 and the left rear second arch longitudinal beam portion 34 in the vehicle width direction. That is, the left third arch longitudinal beam portion 43 does not overlap each of the left front second arch longitudinal beam portion 35 and the left rear second arch longitudinal beam portion 34 in the front-rear direction of the vehicle. Thus, the left third arch longitudinal beam portion 43 is located more away from each of the left front second arch longitudinal beam portion 35 and the left rear second arch longitudinal beam portion 34 than in the case where they overlap in the front-rear direction of the vehicle.

The same applies to the right rear second arch longitudinal beam portion 38, the right front second arch longitudinal beam portion 39, and the right third arch longitudinal beam portion 45 on the right side. The right third arch longitudinal beam portion 45 is located on the outer side of each of the right front second arch longitudinal beam portion 39 and the right rear second arch longitudinal beam portion 38 in the vehicle width direction. That is, the right third arch longitudinal beam portion 45 does not overlap each of the right front second arch longitudinal beam portion 39 and the right rear second arch longitudinal beam portion 38 in the front-rear direction of the vehicle. Thus, the right third arch longitudinal beam portion 45 is located more away from each of the right front second arch longitudinal beam portion 39 and the right rear second arch longitudinal beam portion 38 than in the case where they overlap in the front-rear direction of the vehicle.

Since the distances among the left rear second arch longitudinal beam portion 34, the left front second arch longitudinal beam portion 35, the left third arch longitudinal beam portion 43 increase and, in addition, the distances among the right rear second arch longitudinal beam portion 38, the right front second arch longitudinal beam portion 39, and the right third arch longitudinal beam portion 45 increase, the members that support the roof panel 15 are widely distributed. As a result, the surface stiffness of the roof panel 15 increases and, thus, the strength of the upper section of the vehicle body 10 increases.

Furthermore, in the center of the width of the vehicle body and it's vicinity, the distance C1 between the rear roof arch 21 and the middle second arch lateral beam portion 32 is the same as the distance C1 between the middle second arch lateral beam portion 32 and the rear third arch lateral beam portion 41. The distance C2 between the middle second arch lateral beam portion 32 and the front second arch lateral beam portion 33 is longer than the distance C3 between the rear second arch lateral beam portion 31 and the middle second arch lateral beam portion 32.

That is, the front second arch lateral beam portion 33 is disposed more away from the middle second arch lateral beam portion 32 (toward the rear third arch lateral beam portion 41 having the room light bracket 49 attached thereto) than the rear second arch lateral beam portion 31. Accordingly, the surface stiffness of a portion of the roof panel 15 in the vicinity of the room light bracket 49 increases. Thus, the need for providing a roof arch in the vicinity of the room light bracket 49 can be eliminated. As a result, the number of the roof arches can be decreased.

While the vehicle upper body structure of the present disclosure has been described with reference to a motor vehicle, the present disclosure is not limited to such a form. That is, the present disclosure is not limited to the above-described embodiments if other embodiments can provide the operation and effect of the present disclosure.

The vehicle upper body structure of the present disclosure can be suitably applied to motor vehicles. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle upper body structure comprising:
   a roof panel; and
   a roof arch that extends across the roof panel in a vehicle width direction from one end of the roof panel to an opposite end of the roof panel and that is joined to a lower surface of the roof panel,
   wherein the roof arch includes a first roof arch and a second roof arch disposed in front of the first roof arch, the roof arch further includes a third roof arch disposed in front of the second roof arch,
   wherein the vehicle upper body structure comprises an antenna bracket extending frontward from a midpoint of the first roof arch in the vehicle width direction or a vicinity of the midpoint, the antenna bracket allowing a roof antenna to be mounted thereon and to be mounted on an upper surface of the roof panel,
   wherein the antenna bracket supports the roof panel,
   wherein the second roof arch is disposed such that at least part of the second roof arch extends between right and left rear pillars of a vehicle in plan view,
   wherein the third roof arch includes a room light bracket attached at a rear end of the third roof arch,
   wherein the second roof arch includes a rear second arch lateral beam portion extending in the vehicle width direction, a middle second arch lateral beam portion disposed in front of the rear second arch lateral beam portion and extending in the vehicle width direction, and a front second arch lateral beam portion disposed in front of the middle second arch lateral beam portion and extending in the vehicle width direction, and
   wherein the following equation is satisfied:

$$C1 > C2,$$

wherein C1 is a distance in a vehicle longitudinal direction between the front second arch lateral beam portion and the middle second arch lateral beam portion, and C2 is a distance in the vehicle longitudinal direction between the middle second arch lateral beam portion and the rear second arch lateral beam portion.

2. The vehicle upper body structure according to claim 1, wherein the second roof arch includes a second arch longitudinal beam portion extending from the rear second arch lateral beam portion to the middle second arch lateral beam portion in the vehicle longitudinal direction, and wherein the second arch longitudinal beam portion is disposed in front of the antenna bracket and at the midpoint of the width of the vehicle or the vicinity of the midpoint.

3. The vehicle upper body structure according to claim 2, wherein the second roof arch further includes a right second arch longitudinal beam portion and a left second arch longitudinal beam portion, each extending in the vehicle longitudinal direction, disposed on the right and left sides of the second arch longitudinal beam portion, respectively, wherein the third roof arch includes a rear third arch lateral beam portion extending in the vehicle width direction, a front third arch lateral beam portion disposed in front of the rear third arch lateral beam portion and extending in the vehicle width direction, and a left third arch longitudinal beam portion and a right third arch longitudinal beam portion each extending from the rear third arch lateral beam portion to the front third arch lateral beam portion in the vehicle longitudinal direction, wherein the left third arch longitudinal beam portion is located on an outer position with respect to the left second arch longitudinal beam portion in the vehicle width direction, and wherein the right third arch longitudinal beam portion is located on an outer position with respect to the right second arch longitudinal beam portion in the vehicle width direction.

4. The vehicle upper body structure according to claim 1, wherein the at least part of the second roof arch is aligned with the right and left rear pillars in the vehicle width direction.

5. The vehicle upper body structure according to claim 1, wherein the antenna bracket contacts the lower surface of the roof panel.

6. The vehicle upper body structure according to claim 1, wherein the antenna bracket extends frontward from the first roof arch toward the second roof arch.

7. The vehicle upper body structure according to claim 2, wherein the second arch longitudinal beam portion is aligned with the antenna bracket in the vehicle longitudinal direction.

8. The vehicle upper body structure according to claim 3, wherein the third roof arch includes a third arch longitudinal beam portion extending from the rear third arch lateral beam portion to the front third arch lateral beam portion in the vehicle longitudinal direction, and wherein the third arch longitudinal beam portion is aligned with the second arch longitudinal beam portion and the antenna bracket in the vehicle longitudinal direction.

9. A vehicle comprising the vehicle upper body structure according to claim 1.

10. The vehicle upper body structure according to claim 1, wherein the following equation is satisfied:

$$C1 > C3,$$

wherein $C3$ is a distance in the vehicle longitudinal direction between the front second arch lateral beam portion and the third roof arch.

* * * * *